US009726365B1

(12) United States Patent
Maxik et al.

(10) Patent No.: US 9,726,365 B1
(45) Date of Patent: Aug. 8, 2017

(54) LOW PROFILE LIGHT

(71) Applicant: Lighting Science Group Corporation, Cocoa Beach, FL (US)

(72) Inventors: Fredric S. Maxik, Cocoa Beach, FL (US); Raymond A. Reynolds, Satellite Beach, FL (US); Addy S. Widjaja, Palm Bay, FL (US); Mark Penley Boomgaarden, Satellite Beach, FL (US); Robert R. Soler, San Marcos, CA (US); James Lynn Schellack, Skiatook, OK (US)

(73) Assignee: Lighting Science Group Corporation, Cocoa Beach, FL (US)

( * ) Notice: Subject to any disclaimer, the term of this patent is extended or adjusted under 35 U.S.C. 154(b) by 0 days.

(21) Appl. No.: 15/237,804

(22) Filed: Aug. 16, 2016

Related U.S. Application Data

(63) Continuation of application No. 14/492,348, filed on Sep. 22, 2014, which is a continuation of application (Continued)

(51) Int. Cl.
*B60Q 1/00* (2006.01)
*F21V 29/71* (2015.01)
(Continued)

(52) U.S. Cl.
CPC ............ *F21V 29/713* (2015.01); *F21K 9/235* (2016.08); *F21K 9/238* (2016.08); *F21S 8/026* (2013.01);
(Continued)

(58) Field of Classification Search
CPC .... F21V 29/713; F21V 29/503; F21V 27/773; F21V 21/047; F21V 21/02; F21K 9/235;
(Continued)

(56) References Cited

U.S. PATENT DOCUMENTS 5,738,436 A 4/1998 Cummings et al.
6,161,910 A 12/2000 Reisenauer et al.
(Continued)

FOREIGN PATENT DOCUMENTS

EP 1950491 A1 7/2008
WO WO2008/137732 A1 11/2008

OTHER PUBLICATIONS

Matsushita Electric Works, Ltd., MFORCE High-output, High-color Rendering LED Unit for Lighting Product Literature, 2007, (3 Pages).

(Continued)

*Primary Examiner* — Ali Alavi
(74) *Attorney, Agent, or Firm* — Mark Malek; Daniel Pierron; Widermann Malek, PL

(57) ABSTRACT

A luminaire is providing comprising a heat spreader and a heat sink thermally coupled to the heat spreader, an outer optic retained relative to at least one of the heat spreader and the heat sink, a light source in thermal communication with the heat spreader and comprising a plurality of light emitting diodes (LEDs) that are disposed on the heat spreader such that the heat spreader dissipates heat from the plurality of LEDs, and a power conditioner configured to receive AC voltage and deliver DC voltage to the plurality of LEDs, the power conditioner being disposed on a same side of the heat spreader as the plurality of LEDs. A combination defined by the heat spreader, the heat sink and the outer optic is so dimensioned to cover an opening defined by a nominally sized can light fixture and cover an opening defined by a nominally sized electrical junction box.

5 Claims, 13 Drawing Sheets

Related U.S. Application Data

No. 14/134,884, filed on Dec. 19, 2013, now Pat. No. 8,967,844, which is a continuation of application No. 13/476,388, filed on May 21, 2012, now Pat. No. 8,672,518, which is a continuation-in-part of application No. 12/775,310, filed on May 6, 2010, now Pat. No. 8,201,968.

(60) Provisional application No. 61/248,665, filed on Oct. 5, 2009.

(51) Int. Cl.

| | |
|---|---|
| ***F21V 29/503*** | (2015.01) |
| ***F21K 9/235*** | (2016.01) |
| ***F21K 9/238*** | (2016.01) |
| ***F21S 8/02*** | (2006.01) |
| ***F21S 8/00*** | (2006.01) |
| ***F21S 8/04*** | (2006.01) |
| ***F21V 21/04*** | (2006.01) |
| ***F21V 21/02*** | (2006.01) |
| ***F21V 23/02*** | (2006.01) |
| *F21V 29/77* | (2015.01) |
| *F21Y 115/10* | (2016.01) |
| *F21V 7/04* | (2006.01) |
| *F21V 23/00* | (2015.01) |
| *F21V 23/06* | (2006.01) |

(52) U.S. Cl.

CPC ................. *F21S 8/033* (2013.01); *F21S 8/04* (2013.01); *F21V 21/02* (2013.01); *F21V 21/047* (2013.01); *F21V 23/026* (2013.01); *F21V 29/503* (2015.01); *F21V 7/04* (2013.01); *F21V 23/002* (2013.01); *F21V 23/06* (2013.01); *F21V 29/773* (2015.01); *F21Y 2115/10* (2016.08)

(58) Field of Classification Search

CPC . F21K 9/238; F21S 8/026; F21S 8/033; F21S 8/04; F21Y 2115/10

See application file for complete search history.

(56) References Cited

U.S. PATENT DOCUMENTS

| | | | | |
|---|---|---|---|---|
| 6,168,299 | B1 | 1/2001 | Yan | |
| 6,431,728 | B1 | 8/2002 | Fredericks et al. | |
| 6,561,690 | B2 | 5/2003 | Balestriero et al. | |
| 6,616,291 | B1 | 9/2003 | Love | |
| 6,719,446 | B2 | 4/2004 | Cao | |
| 6,786,625 | B2 | 9/2004 | Wesson | |
| 6,799,864 | B2 | 10/2004 | Bohler et al. | |
| 7,102,172 | B2 | 9/2006 | Lynch et al. | |
| 7,125,146 | B2 | 10/2006 | Willis et al. | |
| 7,250,637 | B2 | 7/2007 | Shimizu et al. | |
| 7,360,925 | B2 | 4/2008 | Coushaine | |
| 7,396,146 | B2 | 7/2008 | Wang | |
| 7,413,321 | B2 | 8/2008 | Kim | |
| 7,540,761 | B2 | 6/2009 | Weber et al. | |
| 7,547,112 | B2 | 6/2009 | Kim | |
| 7,607,812 | B2 | 10/2009 | Kim | |
| 7,670,021 | B2 | 3/2010 | Chou | |
| 7,677,770 | B2 | 3/2010 | Mazzochette | |
| 7,722,220 | B2 | 5/2010 | Van De Ven | |
| 7,722,227 | B2 * | 5/2010 | Zhang | F21S 8/026 362/147 |
| 7,771,085 | B2 | 8/2010 | Kim | |
| 7,810,960 | B1 * | 10/2010 | Soderman | F21K 9/00 362/249.02 |
| 7,828,465 | B2 | 11/2010 | Roberge et al. | |
| 7,892,022 | B2 | 2/2011 | Mostoller et al. | |
| 7,918,591 | B2 * | 4/2011 | Lynch | F21V 19/0055 257/99 |
| 7,950,832 | B2 | 5/2011 | Tanaka et al. | |
| 7,958,832 | B2 * | 6/2011 | Meeker | A43B 3/0078 112/222 |
| 7,959,332 | B2 | 6/2011 | Tickner et al. | |
| 7,980,736 | B2 | 7/2011 | Soderman et al. | |
| 7,993,034 | B2 | 8/2011 | Wegner | |
| 8,096,671 | B1 | 1/2012 | Cronk et al. | |
| 8,201,968 | B2 * | 6/2012 | Maxik | F21S 8/026 362/147 |
| 8,348,477 | B2 | 1/2013 | Tickner et al. | |
| 8,545,047 | B2 | 10/2013 | Yip et al. | |
| 8,672,518 | B2 | 3/2014 | Boomgaarden et al. | |
| 8,967,844 | B2 | 3/2015 | Boomgaarden et al. | |
| 9,103,507 | B2 | 8/2015 | Allen et al. | |
| 2004/0090785 | A1 | 5/2004 | McInnis | |
| 2006/0126328 | A1 | 6/2006 | Coushaine | |
| 2007/0099860 | A1 * | 5/2007 | Sah | C12N 15/113 514/44 R |
| 2008/0037255 | A1 | 2/2008 | Wang | |
| 2008/0232093 | A1 | 9/2008 | Kim | |
| 2008/0232116 | A1 | 9/2008 | Kim | |
| 2008/0278957 | A1 | 11/2008 | Pickard et al. | |
| 2009/0034261 | A1 | 2/2009 | Grove | |
| 2009/0086504 | A1 | 4/2009 | Kim | |
| 2009/0129086 | A1 | 5/2009 | Thompson, III | |
| 2009/0141506 | A1 | 6/2009 | Lan et al. | |
| 2009/0284976 | A1 | 11/2009 | Storch et al. | |
| 2009/0298376 | A1 | 12/2009 | Guillien et al. | |
| 2010/0103678 | A1 | 4/2010 | Van De Ven et al. | |
| 2011/0051414 | A1 | 3/2011 | Bailey et al. | |

OTHER PUBLICATIONS

Lighting Research Center, Lighting Research Program Project 2.3 Low-Profile LED Luminaires, Pier Final Project Report, Prepared for the California Energy Commission, Apr. 2007 (85 Pages).

Inteltech Corporation, Silescent 100i LV Installation Instructions, May 2008, (5 Pages).

EPO, Extended EP Search Report for Application No. EP2010017449, which is now EP Patent No. 2309072 A1. Dec. 14, 2010. EP (8 Pages).

Cree, Inc., LR6 Six Inch Downlight Product Literature, Dec. 19, 2012. (5 Pages).

EPO, European Office Action for Application No. EP2010017449: which is now European Patent No. EP2306072 A1. Mailed on Apr. 8, 2013. EP (4 Pages).

Applicant, Response to EP Office Action for Application No. EP2010017449, which is now EP Patent No. 2306072 A1. Jul. 24, 2013. (25 Pages).

EPO, EP Office Action for Application No. EP2010017499, which is now EP Patent No. 2309072. EP. Mailed Sep. 9, 2014. (5 Pages).

USPTO, Non-Final Office Action for U.S. Appl. No. 14/134,884, which is now U.S. Pat. No. 8,967,844, dated May 1, 2014, (10 Pages).

Applicant, Response to Non-Final Office Action for U.S. Appl. No. 14/134,884, which is now U.S. Pat. No. 8,967,84 dated May 1, 2014, Filed Jul. 31, 2014. (9 Pages).

USPTO, Non-Final Office Action for U.S. Appl. No. 14/134,884, which is now U.S. Pat. No. 8,967,844, dated Oct. 28, 2014 (10 Pages).

Applicant, Response to Non-Final Office Action for U.S. Appl. No. 14/134,884, which is now U.S. Pat. No. 8,967,84, dated Oct. 28, 2014, Filed Nov. 13, 2014 (13 Pages).

Applicant, Response to EP Office Action for Application No. EP2010017449, which is now EP Patent No. 2309072. Mar. 3, 2015 (62 Pages).

Applicant, Cooper Lighting's Initial Disclosure of Non-Infringement Contentions, filed in the U.S. District Court for the Middle District of Florida Orlando Division, Case No. 6:13-cv-00587-RBD-GJK, (15 Pages).

Applicant, Cooper Lighting's initial Disclosure of Invalidity Contentions (Anticipation), filed in the U.S. District Court for the Middle District of Florida Orlando Division, Case No. 6:13-cv-00587-RBD-GJK, (22 Pages).

(56) References Cited

OTHER PUBLICATIONS

Applicant, Cooper Lighting's Initial Disclosure of Invalidity Contentions (Obviousness), filed in the U.S. District Court for the Middle District of Florida Orlando Division, Case No. 6:13-cv-00587-RBD-GJK, (29 Pages).
Cree, Inc. as Defendant, Preliminary Invalidity Contentions, filed in the U.S. District Court for the Middle District pf Florida Orlando Division, Case No. 6:13-cv-00587-RBD-GJK, (500 Pages).
Seagull Lighting, HC-1530 012210 Product Literature, Unknown Publication Date. (3 Pages).
Generation Brands, Inc., Defendant, "Defendant's Preliminary Invalidity Contentions for U.S. Pat. No. 8,201,968", filed in be United States District Court for the Middle District of Florida Orlando Division, Case No. 6:16-cv-338-RBD-GJK, 67 pages.
Generation Brands, Inc., Defendant, "Defendant's Preliminary Invalidity Contentions for U.S. Pat. No. 8,967,844", filed in the United States District Court for the Middle District of Florida Orlando Division, Case No. 6:16-cv-338-RBD-GJK, 74 pages.
American De Rosa Lamparts, LLC, Defendant, "Defendant and Counterclaim Plaintiff's Preliminary Invalidity Contentions", filed in the United States District Court for the Middle District of Florida Orlando Division, Case No. 6:16-av-1087-ORL-41KRS, 233 pages.
Technical Consumer Products, Inc., Defendant, "Defendant Technical Consumer Products, Inc.'s Initial Invalidity Contentions", filed in the United States District Court for the Middle District of Florida Orlando Division, Case No. 6:16-av-1255-Orl-375GJK, 414 pages.
Nicor, Inc., Defendant, "Defendant Nicor, Inc.'s Preliminary Non-Infringement and Invalidity Disclosures", filed in the United States District Court for the Middle District of Florida Orlando Division, Case No. 6:16-cv-413-ORL-37GJK, 60 pages.
Amax Lighting, Inc., Defendant, "AMAX Lighting's Non-Infringement Contentions and Invalidity Contentions", filed in the United States District Court for the Middle District of Florida Orlando Division, Case No. 6:16-01321-Orl-37GJK, 470 pages.

* cited by examiner

LOW PROFILE LIGHT

CROSS REFERENCE TO RELATED APPLICATIONS

This application is a continuation of and claims benefit under 35 U.S.C. §§111 and 120 of U.S. patent application Ser. No. 14/492,348 titled Low Profile Light and Accessory kit for the Same filed Sep. 22, 2014, which in turn is a continuation of U.S. patent application Ser. No. 14/134,884, now U.S. Pat. No. 8,967,844, titled Low Profile Light and Accessory kit for the Same filed Dec. 19, 2013, which in turn is a continuation of U.S. patent application Ser. No. 13/476,388, now U.S. Pat. No. 8,672,518, titled Low Profile Light and Accessory kit for the Same filed May 21, 2012, which in turn is a continuation-in-part of U.S. patent application Ser. No. 12/775,310, now U.S. Pat. No. 8,201,968, titled Low Profile Light filed May 6, 2010, which in turn claims the benefit of U.S. Provisional Application Ser. No. 61/248,665, titled Low Profile Light filed Oct. 5, 2009, the content of each of which is incorporated herein by reference in their entireties.

BACKGROUND OF THE INVENTION

The present disclosure relates generally to lighting, particularly to low profile lighting, and more particularly to low profile downlighting for retrofit applications.

Light fixtures come in many shapes and sizes, with some being configured for new work installations while others are configured for old work installations. New work installations are not limited to as many constraints as old work installations, which must take into account the type of electrical fixture/enclosure or junction box existing behind a ceiling or wall panel material. With recessed ceiling lighting, sheet metal can-type light fixtures are typically used, while surface-mounted ceiling and wall lighting typically use metal or plastic junction boxes of a variety of sizes and depths. With the advent of LED (light emitting diode) lighting, there is a great need to not only provide new work LED light fixtures, but to also provide LED light fixtures that are suitable for old work applications, thereby enabling retrofit installations. One way of providing old work LED lighting is to configure an LED luminaire in such a manner as to utilize the volume of space available within an existing fixture (can-type fixture or junction box). However, such configurations typically result in unique designs for each type and size of fixture. Accordingly, there is a need in the art for an LED lighting apparatus that overcomes these drawbacks.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

An embodiment of the invention includes a luminaire having a heat spreader and a heat sink thermally coupled to and disposed diametrically outboard of the heat spreader, an outer optic securely retained relative to at least one of the heat spreader and the heat sink, and a light source disposed in thermal communication with the heat spreader, the light source having a plurality of light emitting diodes (LEDs). The heat spreader, the heat sink and the outer optic, in combination, have an overall height Hand an overall outside dimension D such that the ratio of H/D is equal to or less than 0.25. The combination defined by the heat spreader, the heat sink and the outer optic, is so dimensioned as to: cover an opening defined by a nominally sized four-inch can light fixture; and, cover an opening defined by a nominally sized four-inch electrical junction box.

An embodiment of the invention includes a luminaire having a heat spreader and a heat sink thermally coupled to and disposed diametrically outboard of the heat spreader. An outer optic is securely retained relative to at least one of the heat spreader and the heat sink. A light source is disposed in thermal communication with the heat spreader, the light source having a plurality of light emitting diodes (LEDs). A power conditioner is disposed in electrical communication with the light source, the power conditioner being configured to receive AC voltage from an electrical supply line and to deliver DC voltage to the plurality of LEDs, the power conditioner being so dimensioned as to fit within at least one of: a nominally sized four-inch can light fixture; and, a nominally sized four-inch electrical junction box.

An embodiment of the invention includes a luminaire having a heat spreader, a heat sink thermally coupled to and disposed diametrically outboard of the heat spreader, an outer optic securely retained relative to at least one of the heat spreader and the heat sink, a light source disposed in thermal communication with the heat spreader, and an electrical supply line disposed in electrical communication with the light source. The heat spreader, heat sink and outer optic, in combination, have an overall height Hand an overall outside dimension D such that the ratio of HID is equal to or less than 0.25. The defined combination is so dimensioned as to: cover an opening defined by a nominally sized four-inch can light fixture; and, cover an opening defined by a nominally sized four-inch electrical junction box.

An embodiment of the invention includes a luminaire having a housing with a light unit and a trim unit. The light unit includes a light source, and the trim unit is mechanically separable from the light unit. A means for mechanically separating the trim unit from the light unit provides a thermal conduction path therebetween. The light unit has sufficient thermal mass to spread heat generated by the light source to the means for mechanically separating, and the trim unit has sufficient thermal mass to serve as a heat sink to dissipate heat generated by the light source.

An embodiment of the invention includes a luminaire for retrofit connection to an installed light fixture having a concealed in-use housing. The luminaire includes a housing having a light unit and a trim unit, the light unit having a light source, and the trim unit being mechanically separable from the light unit. The trim unit defines a heat sinking thermal management element, configured to dissipate heat generated by the light source, that is completely 100% external of the concealed in-use housing of the installed light fixture.

BRIEF DESCRIPTION OF THE DRAWINGS

Referring to the exemplary drawings wherein like elements are numbered alike in the accompanying Figures, abbreviated in each illustration as "Fig.".

DETAILED DESCRIPTION OF THE INVENTION

Figure 1:
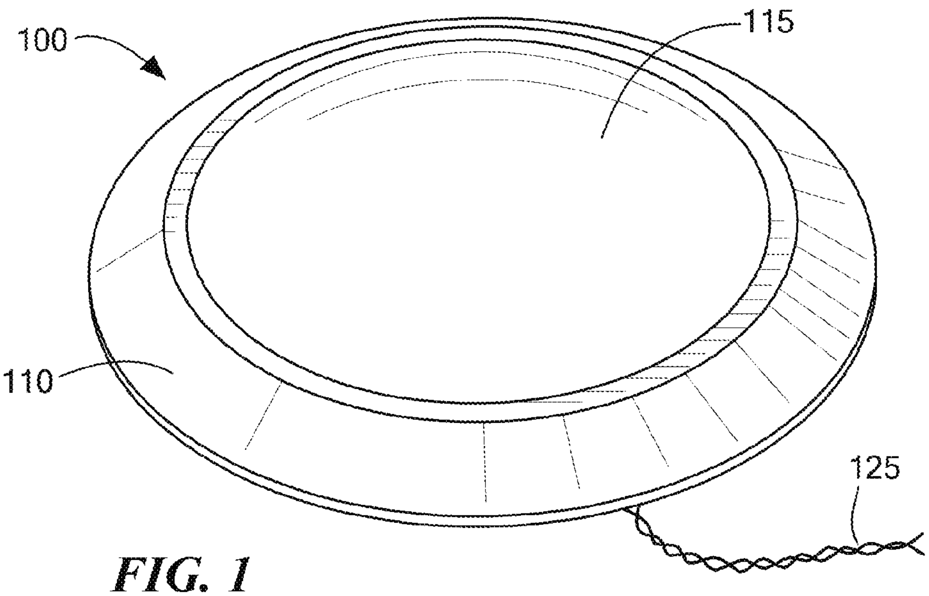
FIG. 1 depicts an isometric top view of a luminaire in accordance with an embodiment of the invention.
Figure 2:
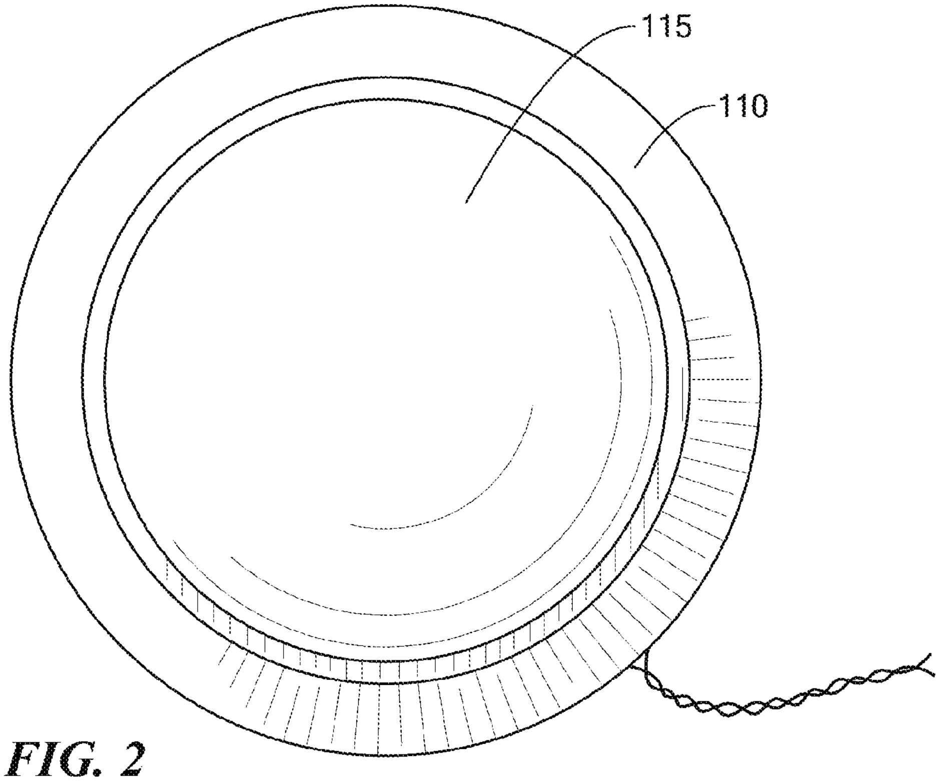
FIG. 2 depicts a top view of the luminaire of FIG. 1.

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

An embodiment of the invention, as shown and described by the various figures and accompanying text, provides a low profile downlight, more generally referred to as a luminaire, having an LED light source disposed on a heat spreader, which in turn is thermally coupled to a heat sink that also serves as the trim plate of the luminaire. The luminaire is configured and dimensioned for retrofit installation on standard can-type light fixtures used for recessed ceiling lighting, and on standard ceiling or wall junction boxes (J-boxes) used for ceiling or wall mounted lighting. The luminaire is also suitable for new work installation.

While embodiments of the invention described and illustrated herein depict an example luminaire for use as a downlight when disposed upon a ceiling, it will be appreciated that embodiments of the invention also encompass other lighting applications, such as a wall sconce for example.

While embodiments of the invention described and illustrated herein depict example power conditioners having visually defined sizes, it will be appreciated that embodiments of the invention also encompass other power conditioners having other sizes as long as the power conditioners fall within the ambit of the invention disclosed herein.

Referring to FIGS. 1-26 collectively, a luminaire 100 includes a heat spreader 105, a heat sink 110 thermally coupled to and disposed diametrically outboard of the heat spreader, an outer optic 115 securely retained relative to at least one of the heat spreader 105 and the heat sink 110, a light source 120 disposed in thermal communication with the heat spreader 105, and an electrical supply line 125 disposed in electrical communication with the light source 120. To provide for a low profile luminaire 100, the combination of the heat spreader 105, heat sink 110 and outer optic 115, have an overall height H and an overall outside dimension D such that the ratio of H/D is equal to or less than 0.25. In an example embodiment, height His 1.5-inches, and outside dimension D is a diameter of 7-inches. Other dimensions for Hand Dare contemplated such that the combination of the heat spreader 105, heat sink 110 and outer optic 115, are configured and sized so as to; (i) cover an opening defined by an industry standard can-type light fixture having nominal sizes from three-inches to six-inches (see FIGS. 14 and 15 for example); and, (ii) cover an opening defined by an industry standard electrical junction box having nominal sizes from three-inches to six-inches (see FIGS. 16 and 17 for example). Since can-type light fixtures and ceiling/wall mount junction boxes are designed for placement behind a ceiling or wall material, an example luminaire has the back surface of the heat spreader 105 substantially planar with the back surface of the heat sink 110, thereby permitting the luminaire 100 to sit substantially flush on the surface of the ceiling/wall material. Alternatively, small standoffs 200 (see FIG. 12 for example) may be used to promote air movement around the luminaire 100 for improved heat transfer to ambient, which will be discussed further below. Securement of the luminaire 100 to a junction box may be accomplished by using suitable fasteners through appropriately spaced holes 150 (see FIG. 8 for example), and securement of the luminaire 100 to a can-type fixture may be accomplished by using extension springs 205 fastened at one end to the heat spreader 105 (see FIG. 12 for example) and then hooked at the other end onto an interior detail of the can-type fixture.

In an embodiment, the light source 120 includes a plurality of light emitting diodes (LEDs) (also herein referred to as an LED chip package), which is represented by the "checkered box" in FIGS. 5, 6 and 8-10. In application, the LED chip package generates heat at the junction of each LED die. To dissipate this heat, the LED chip package is disposed in suitable thermal communication with the heat spreader 105, which in an embodiment is made using aluminum, and the heat spreader is disposed in suitable thermal communication with the heat sink 110, which in an embodiment is also made using aluminum. To provide for suitable heat transfer from the heat spreader 105 to the heat sink 110, an embodiment employs a plurality of interconnecting threads 130, 135, which when tightened provide suitable surface area for heat transfer thereacross.

Embodiments of luminaire 100 may be powered by DC voltage, while other embodiments may be powered by AC voltage. In a DC-powered embodiment, the electrical supply lines 125, which receive DC voltage from a DC supply, are directly connected to the plurality of LEDs 120. Holes 210 (see FIG. 9 for example) in the heat spreader 105 permit passage of the supply lines 125 from the back side of the heat spreader 105 to the front side. In an AC-powered embodiment, a suitable power conditioner 140, 160, 165 (see FIGS. 8, 9 and 11 for example) is used.

Figure 8:
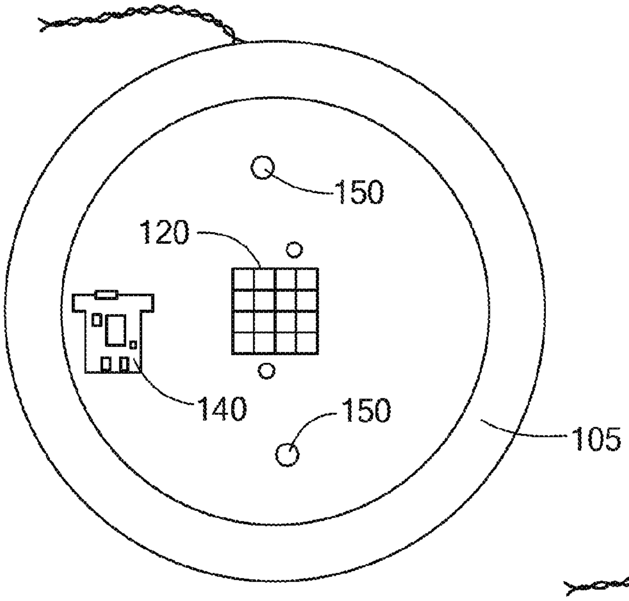
FIG. 8 depicts a top view of an alternative heat spreader assembly in accordance with an embodiment of the invention.

In an embodiment, and with reference to FIG. 8, power conditioner 140 is disposed on the heat spreader 105 on a same side of the heat spreader as the plurality of LEDs 120. In an embodiment, the power conditioner 140 is an electronic circuit board having electronic components configured to receive AC voltage from the electrical supply line 125 and to deliver DC voltage to the plurality of LEDs through appropriate electrical connections on either the front side or the back side of the heat spreader 105, with holes through the heat spreader or insulated electrical traces across the surface of the heat spreader being used as appropriate for the purposes.

Figure 9:
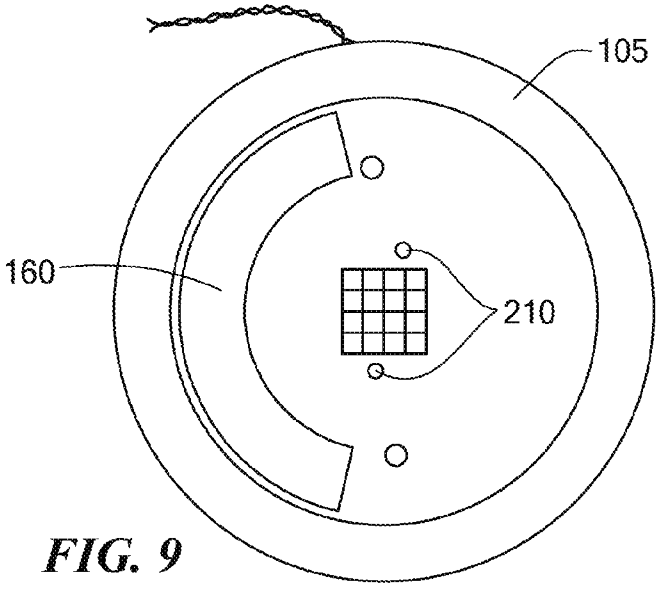
FIG. 9 depicts a top view of another alternative heat spreader assembly in accordance with an embodiment of the invention.

In an alternative embodiment, and with reference to FIG. 9, an arcshaped electronic-circuit-board-mounted power conditioner 160 may be used in place of the localized power conditioner 140 illustrated in FIG. 8, thereby utilizing a larger available area of the heat spreader 105 without detracting from the lighting efficiency of luminaire 100.

Figure 11:
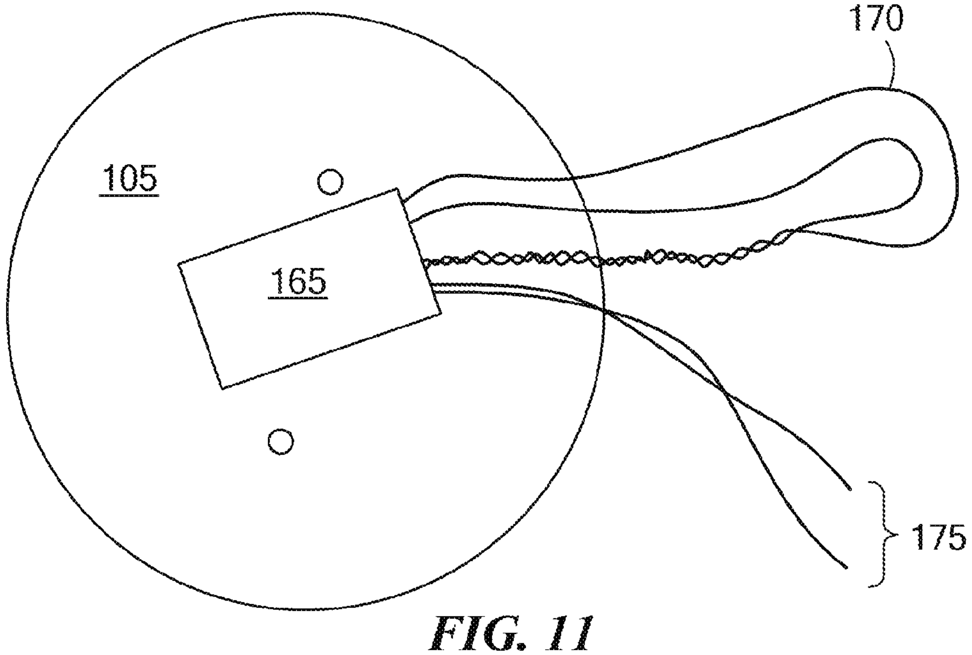
FIG. 11 depicts a bottom view of a heat spreader having a power conditioner in accordance with an embodiment of the invention.

In a further embodiment, and with reference to FIG. 11, a block-type power conditioner 165 (electronics contained within a housing) may be used on the back surface of the heat spreader 105, where the block-type power conditioner 165 is configured and sized to fit within the interior space of an industry-standard nominally sized can-type light fixture or an industry-standard nominally sized wall/ceiling junction box. Electrical connections between the power conditioner 165 and the LEDs 120 are made via wires 170, which may be contained within the can fixture or junction box, or may be self-contained within the power conditioner housing. Electrical wires 175 receive AC voltage via electrical connections within the can fixture or junction box.

Figure 12:
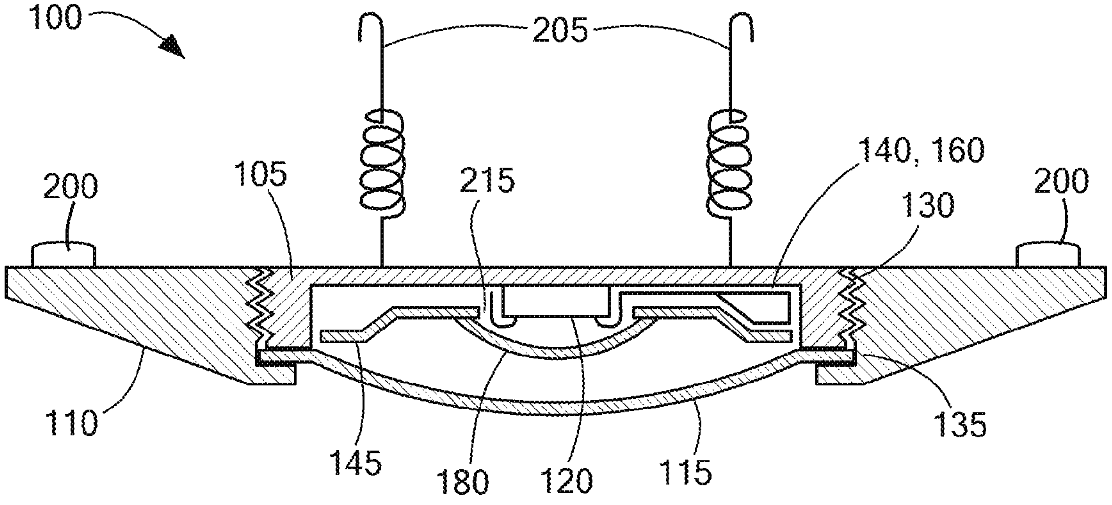
FIG. 12 depicts a section view of a luminaire in accordance with an embodiment of the invention.

Referring now to FIGS. 8-10 and 12, an embodiment includes a reflector 145 disposed on the heat spreader 105 so as to cover the power conditioner 140, 160, while permitting the plurality of LEDs 120 to be visible (i.e., uncovered) through an aperture 215 of the reflector 145. Mounting holes 155 in the reflector 145 align with mounting holes 150 in the heat spreader 105 for the purpose discussed above. The reflector 145 provides a reflective covering that hides power conditioner 140, 160 from view when viewed from the outer optic side of luminaire 100, while efficiently reflecting light from the LEDs 120 toward the outer optic 115. FIG. 12 illustrates a section view through luminaire 100, showing a stepped configuration of the reflector 145, with the power conditioner 140, 160 hidden inside a pocket (i.e., between the reflector 145 and the heat spreader 105), and with the LEDs 120 visible through the aperture 215. In an embodiment, the outer optic is made using a glass-bead-impregnated-plastic material. In an embodiment the outer optic 115 is made of a suitable material to mask the presence of a pixilated light source 120 disposed at the center of the luminaire. In an embodiment, the half angle power of the luminaire, where the light intensity of the light source when viewed at the outer optic drops to 50% of its maximum intensity, is evident within a central diameter of the outer optic that is equal to or greater than 50% of the outer diameter of the outer optic.

Figure 10:
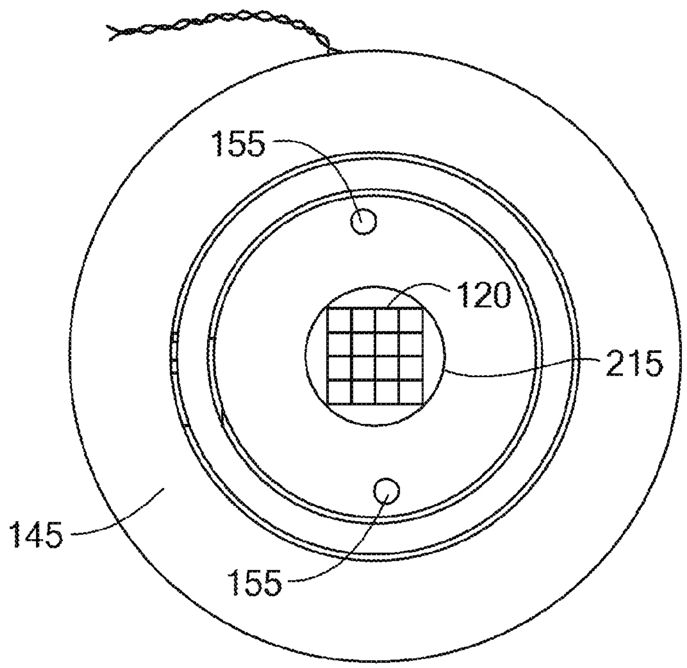
FIG. 10 depicts a top view of yet another alternative heat spreader assembly in accordance with an embodiment of the invention.

While FIG. 10 includes a reflector 145, it will be appreciated that not all embodiments of the invention disclosed herein may employ a reflector 145, and that when a reflector 145 is employed it may be used for certain optical preferences or to mask the electronics of the power conditioner 140, 160. The reflective surface of the reflector 145 may be white, reflective polished metal, or metal film over plastic, for example, and may have surface detail for certain optical effects, such as color mixing or controlling light distribution and/or focusing for example.

Referring to FIG. 12, an embodiment includes an inner optic 180 disposed over the plurality of LEDs 120. Employing an inner optic 180 not only provides protection to the LEDs 120 during installation of the luminaire 100 to a can fixture or junction box, but also offers another means of color-mixing and/or diffusing and/or colortemperature-adjusting the light output from the LEDs 120. In alternative embodiments, the inner optic 180 may be a standalone element, or integrally formed with the reflector 145. In an embodiment, the LEDs 120 are encapsulated in a phosphor of a type suitable to produce a color temperature output of 2700 deg-Kelvin. Other LEDs with or without phosphor encapsulation may be used to produce other color temperatures as desired.

Figure 13:
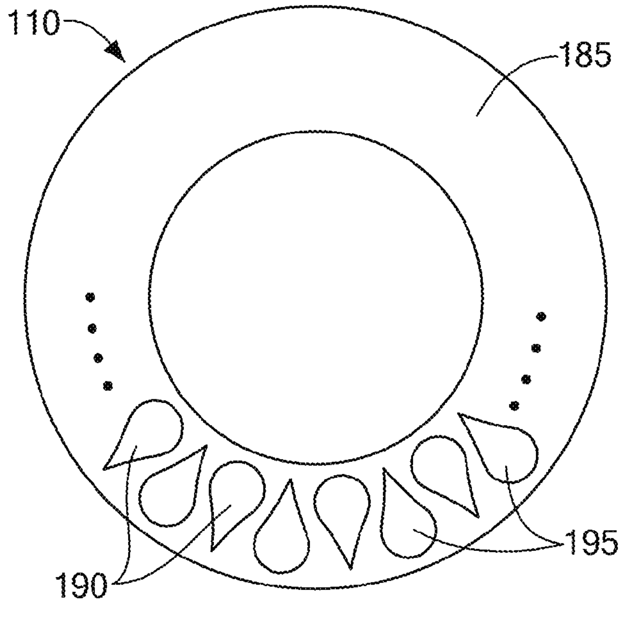
FIG. 13 depicts a bottom view of a heat sink having recesses in accordance with an embodiment of the invention.

Referring to FIG. 13, a back surface 185 of the heat sink 110 includes a first plurality of recesses 190 oriented in a first direction, and a second plurality of recesses 195 oriented in a second opposing direction, each recess of the first plurality and the second plurality having a shape that promotes localized air movement within the respective recess due at least in part to localized air temperature gradients and resulting localized air pressure gradients. Without being held to any particular theory, it is contemplated that a teardrop-shaped recess 190, 195 each having a narrow end and an opposing broad end will generate localized air temperatures in the narrow end that are higher than localized air temperatures in the associated broad end, due to the difference of proximity of the surrounding "heated" walls of the associated recess. It is contemplated that the presence of such air temperature gradients, with resulting air pressure gradients, within a given recess 190, 195 will cause localized air movement within the associated recess, which in turn will enhance the overall heat transfer of the thermal system (the thermal system being the luminaire 100 as a whole). By alternating the orientation of the recesses 190, 195, such that the first plurality of recesses 190 and the second plurality of recesses 195 are disposed in an alternating fashion around the circumference of the back 185 of the heat sink 110, it is contemplated that further enhancements in heat transfer will be achieved, either by the packing density of recesses achievable by nesting one recess 190 adjacent the other 195, or by alternating the direction vectors of the localized air temperature/pressure gradients to enhance overall air movement. In an embodiment, the first plurality of recesses 190 have a first depth into the back surface of the heat sink, and the second plurality of recesses 195 have a second depth into the back surface of the heat sink, the first depth being different from the second depth, which is contemplated to further enhance heat transfer.

Figure 15:
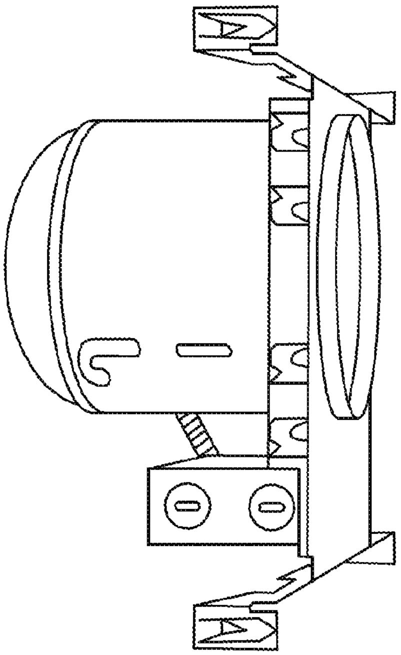
FIGS. 14-18 depict isometric views of existing electrical can-type light fixtures and electrical junction boxes for use in accordance with an embodiment of the invention.
Figure 18:
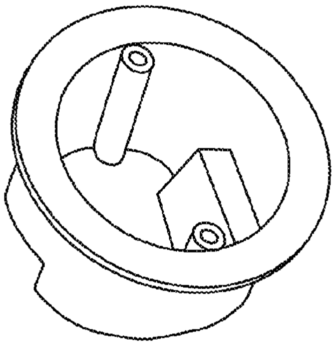
Figure 17:
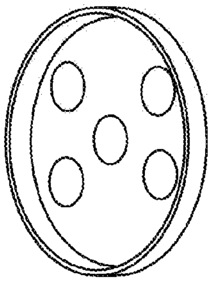
Figure 16:
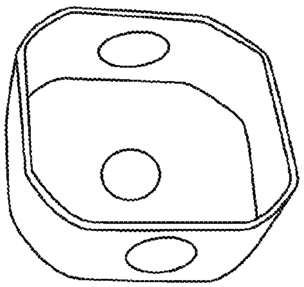

FIGS. 14-18 illustrate typical industry standard can-type light fixtures for recessed lighting (FIGS. 14-15), and typical industry standard electrical junction boxes for ceiling or wall mounted lighting (FIGS. 16-18). Embodiments of the invention are configured and sized for use with such fixtures of FIGS. 14-18.

Figure 19:
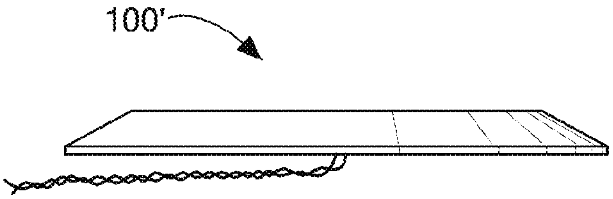
FIGS. 19-21 depict a side view, top view and bottom view, respectively, of a luminaire similar but alternative to that of FIGS. 2-4, in accordance with an embodiment of the invention.
Figure 20:
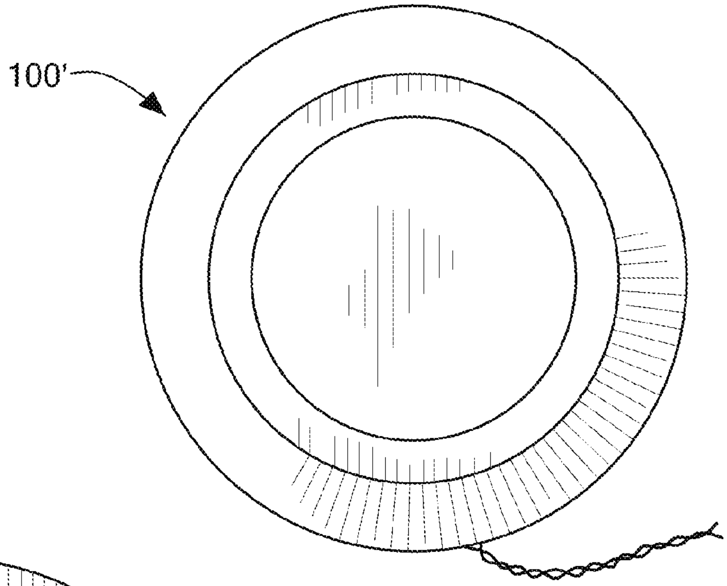
Figure 21:
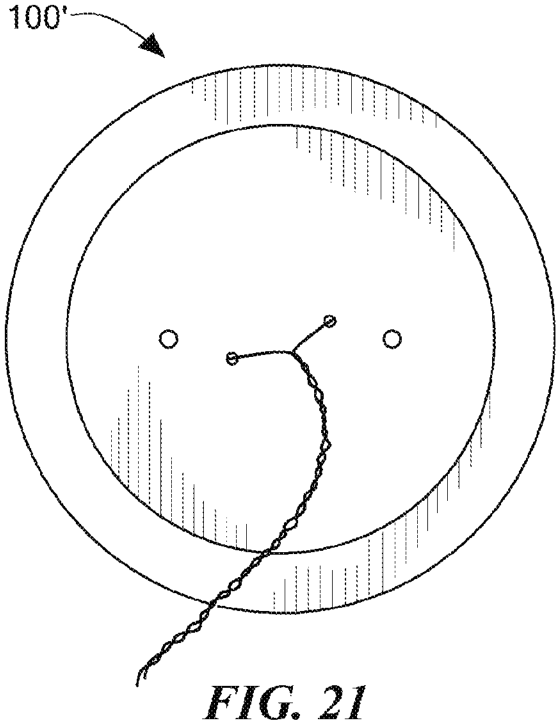

FIGS. 19-21 illustrate an alternative luminaire 100' having a different form factor (flat top, flat outer optic, smaller appearance) as compared to luminaire 100 of FIGS. 1-4.

Figure 22:
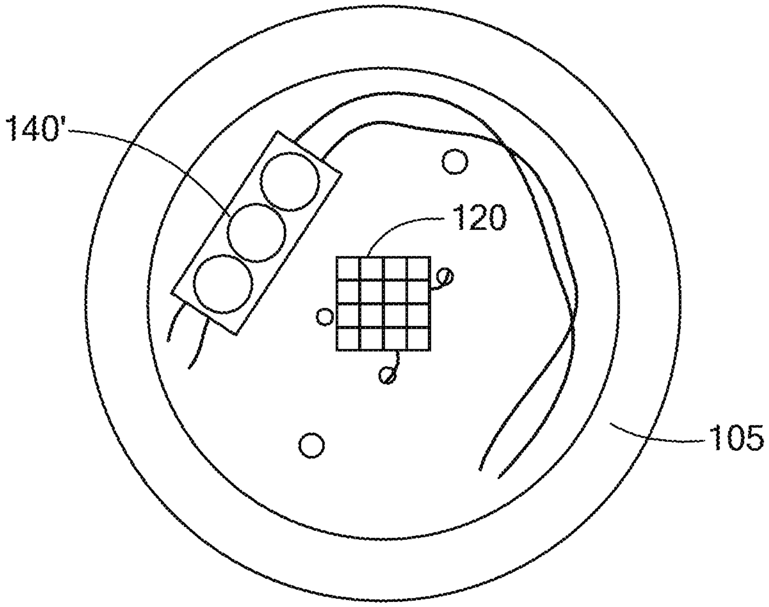
FIGS. 22-23 depict top and bottom views, respectively, of a heat spreader having an alternative power conditioner in accordance with an embodiment of the invention.
Figure 23:
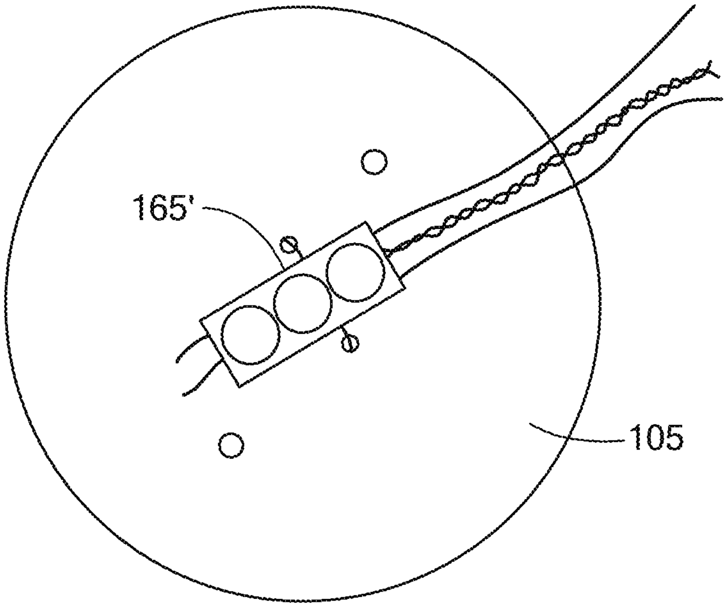

FIGS. 22-23 illustrate alternative electronic power conditioners 140', 165' having a different form factor as compared to power conditioners 140, 165 of FIGS. 8 and 11, respectively. AD alternative embodiments disclosed herein, either explicitly, implicitly or equivalently, are considered within the scope of the invention.

Figure 24:
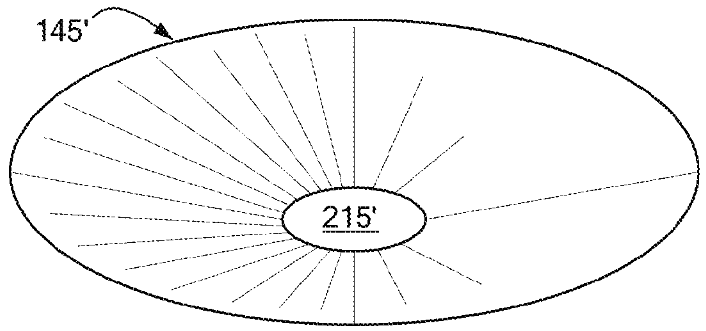
FIG. 24-26 depict in isometric, top and side views, respectively, an alternative reflector to that depicted in FIGS. 10 and 12.
Figure 25:
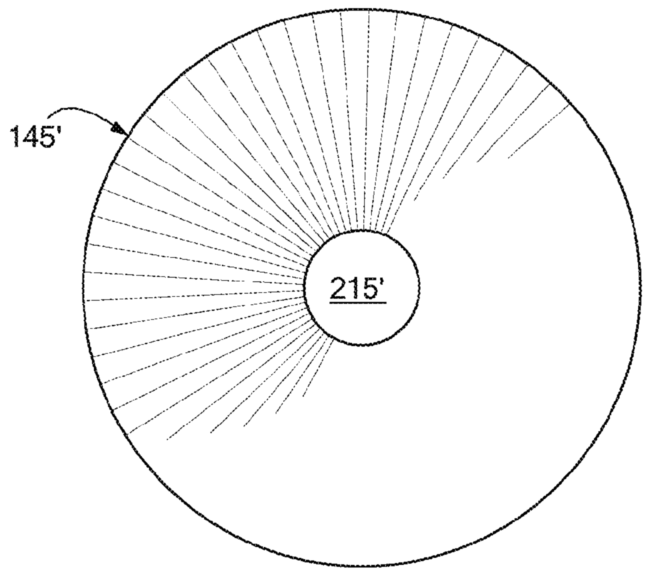
Figure 26:
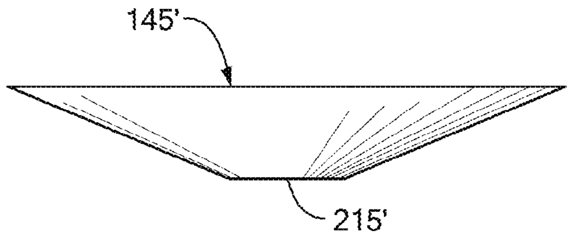

FIGS. 24-26 illustrate an alternative reflector 145' to that illustrated in FIGS. 10 and 12, with FIG. 24 depicting an isometric view, FIG. 25 depicting a top view, and FIG. 26 depicting a side view of alternative reflector 145'. As illustrated, reflector 145' is conically-shaped with a centrally disposed aperture 215' for receiving the LED package 120. The cone of reflector 145' has a shallow form factor so as to fit in the low profile luminaire 100, 100'. Similar to reflector 145, the reflective surface of the reflector 145' may be white, reflective polished metal, or metal film over plastic, for example, and may have surface detail for certain optical effects, such as color mixing or controlling light distribution and/or focusing for example. As discussed herein with respect to reflector 145, alternative reflector 145' mayor may not be employed as required to obtain the desired optical effects.

From the foregoing, it will be appreciated that embodiments of the invention also include a luminaire 100 with a housing (collectively referred to by reference numerals 105, 110 and 115) having a light unit (collectively referred to by reference numerals 105 and 115) and a trim unit 110, the light unit including a light source 120, the trim unit being mechanically separable from the light unit, a means for mechanically separating 130, 135 the trim unit from the light unit providing a thermal conduction path therebetween, the light unit having sufficient thermal mass to spread heat generated by the light source to the means for mechanically separating, the trim unit having sufficient thermal mass to serve as a heat sink to dissipate heat generated by the light source.

From the foregoing, it will also be appreciated that embodiments of the invention further include a luminaire 100 for retrofit connection to an installed light fixture having a concealed in-use housing (see FIGS. 14-18 for example), the luminaire including a housing 105, 110, 115 having a light unit 105, 115 and a trim unit 110, the light unit comprising a light source 120, the trim unit being mechanically separable from the light unit, the trim unit defining a heat sinking thermal management element configured to dissipate heat generated by the light source that is completely 100% external of the concealed in-use housing of the installed light fixture. As used herein, the term "concealed in-use housing" refers to a housing that is hidden behind a ceiling or a wall panel once the luminaire of the invention has been installed thereon.

Figure 27:
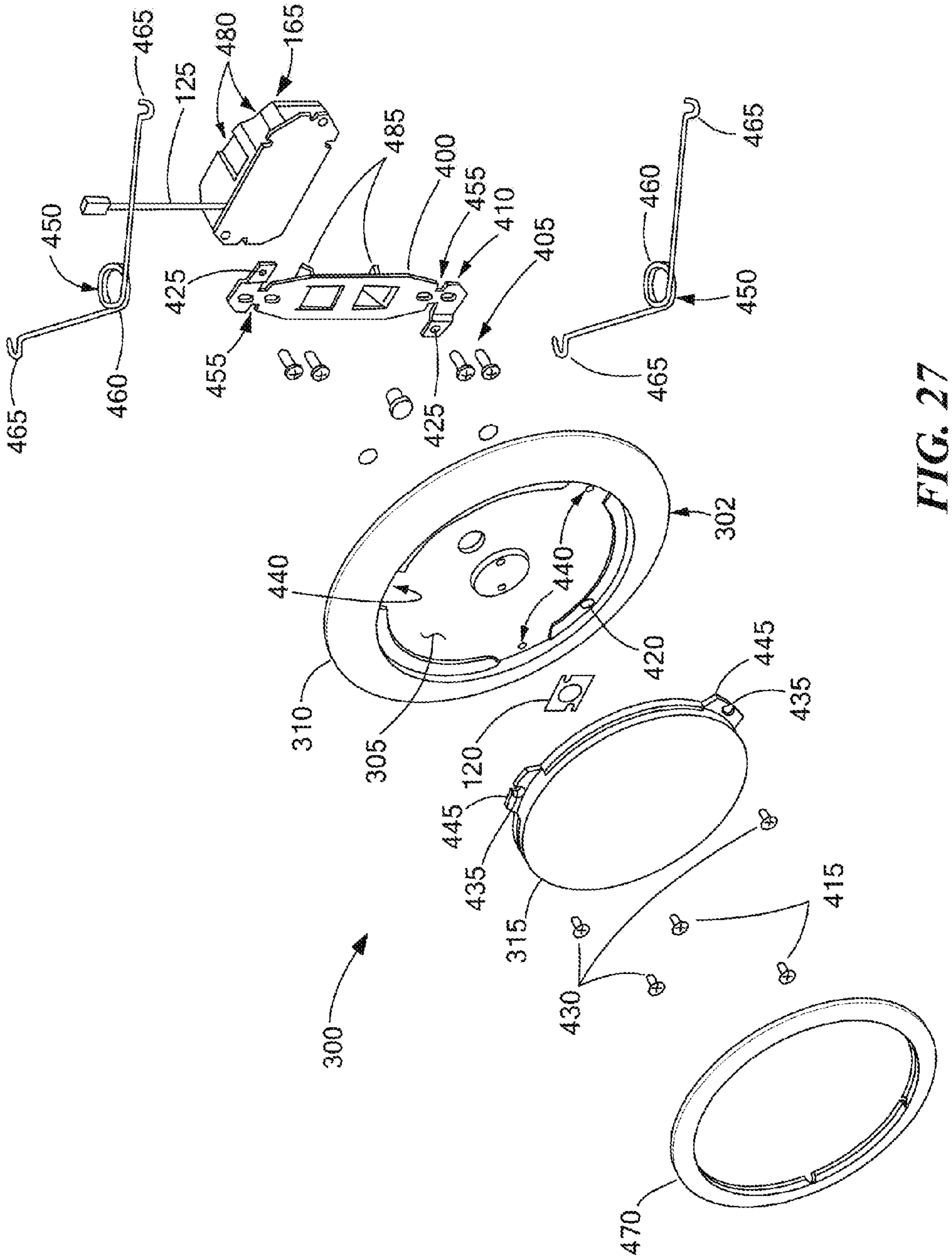
FIG. 27 depicts an exploded assembly view of an alternative luminaire in accordance with an embodiment of the invention.

Reference is now made to FIG. 27, which depicts an exploded assembly view of an alternative luminaire 300 to that depicted in FIGS. 1-12. Similar to luminaire 100 (where like elements are numbered alike, and similar elements are named alike but numbered differently), luminaire 300 includes a heat spreader 305 integrally formed with a heat sink 310 disposed diametrically outboard of the heat spreader 305 (the heat spreader 305 and heat sink 310 are collectively herein referred to as base 302), an outer optic 315 securely retained relative to at least one of the heat spreader 305 and the heat sink 310, a light source (LED) 120 disposed in thermal communication with the heat spreader 305, and an electrical supply line 12S disposed in electrical communication with the light source 120. The integrally formed heat spreader 305 and heat sink 310 provides for improved heat flow from the LED 120 to the heat sink 310 as the heat flow path therebetween is continuous and uninterrupted as compared to the luminaire 100 discussed above.

Figure 28:
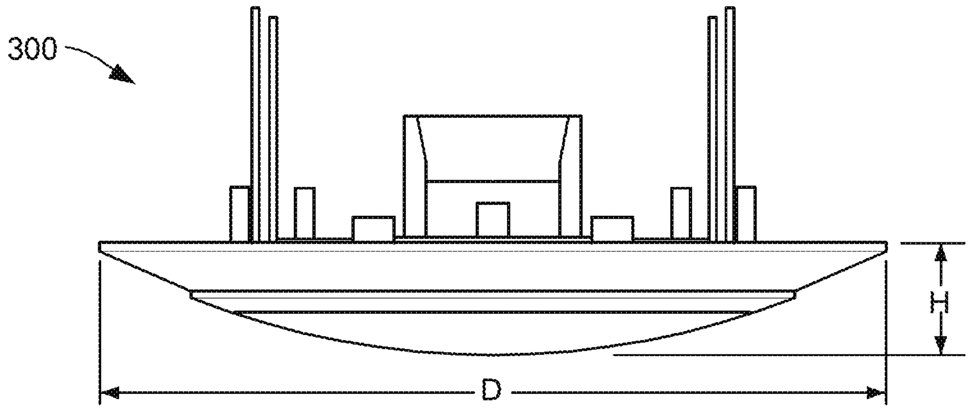
FIG. 28 depicts a side view of the luminaire of FIG. 27.

To provide for a low profile luminaire 300, the combination of the heat spreader 305, heat sink 310 and outer optic 315, have an overall height H and an overall outside dimension D such that the ratio of H/D is equal to or less than 0.25 (best seen by reference to FIG. 28). In an example embodiment, height H is 1.5-inches, and outside dimension D is a diameter of 7-inches. Other dimensions for H and D are contemplated such that the combination of the heat spreader 305, heat sink 310 and outer optic 315, are so configured and dimensioned as to; (i) cover an opening defined by an industry standard can-type light fixture having nominal sizes from three-inches to six-inches (see FIGS. 14 and 15 for example); and, (ii) cover an opening defined by an industry standard electrical junction box having nominal sizes from three-inches to six-inches (see FIGS. 16 and 17 for example). Since can-type light fixtures and ceiling/wall mount junction boxes are designed for placement behind a ceiling or wall material, an example luminaire 300 has the back surface of the heat spreader 305 substantially planar with the back surface of the heat sink 310, thereby permitting the luminaire 300 to sit substantially flush on the surface of the ceiling/wall material. Alternatively, small standoffs 200 (see FIG. 12 in combination with FIG. 27 for example) may be used to promote air movement around the luminaire 300 for improved heat transfer to ambient, as discussed above.

Securement of the luminaire 300 to a junction box (see FIGS. 16-18 for example) may be accomplished by using a bracket 400 and suitable fasteners 405 (four illustrated) through appropriately spaced holes 410 (four illustrated) in the bracket 400. Securement of the base 302 to the bracket 400 is accomplished using suitable fasteners 415 (two illustrated) through appropriately spaced holes 420 (two used, diametrically opposing each other, but only one visible) in the base 302, and threaded holes 425 (two illustrated) in the bracket 400. Securement of the optic 315 to the base 302 is accomplished using suitable fasteners 430 (three illustrated) through appropriately spaced holes 435 (three used, spaced 120 degrees apart, but only two illustrated) in tabs 445 of the optic 315, and threaded holes 440 (three used, spaced 120 degrees apart, but only two illustrated) in the base 302. A trim ring 470 circumferentially snap-fits over the optic 315 to hide the retaining fasteners 430, the holes 435 and the tabs 445. The snap-fit arrangement of the trim ring 470 relative to the optic 315 is such that the trim ring 470 can be removed in a pop-off manner for maintenance or other purposes.

Figure 14:
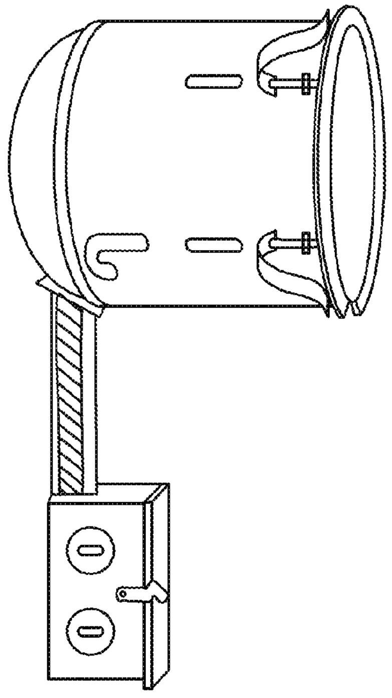

Securement of the luminaire 300 to a can-type fixture (see FIGS. 14-15 for example) may be accomplished by using two torsion springs 450 each loosely coupled to the bracket 400 at a pair of notches 455 by placing the circular portion 460 of each torsion spring 450 over the pairs of notches 455, and then engaging the hook ends 465 of the torsion spring 450 with suitable detents in the can-type fixture (known detent features of can-type light fixtures are depicted in FIGS. 14-15). In an embodiment, the circular portion 460 of each torsion spring 450 and the distance between each notch of a respective pair of notches 455 are so dimensioned as to permit the torsion springs 450 to lay flat (that is, parallel with the back side of luminaire 300) during shipping, and to be appropriately rotated for engagement with a can-type fixture during installation (as illustrated in FIGS. 27-30).

A power conditioner 165 similar to that discussed above in connection with FIG. 11 receives AC power from electrical connections within the junction box or can-type fixture, and provides conditioned DC power to the light source (LED) 120. While illustrative details of the electrical connections between the power conditioner 165 and the light source (LED) 120 are not specifically shown in FIG. 27, one skilled in the art will readily understand how to provide such suitable connections when considering all that is disclosed herein in combination with information known to one skilled in the art. The housing of power conditioner 165 includes recesses 480 (one on each side, only one illustrated) that engage with tabs 485 of the bracket 400 to securely hold the power conditioner 165 in a snap-fit or frictional-fit engagement relative to the bracket 400.

Figure 3:
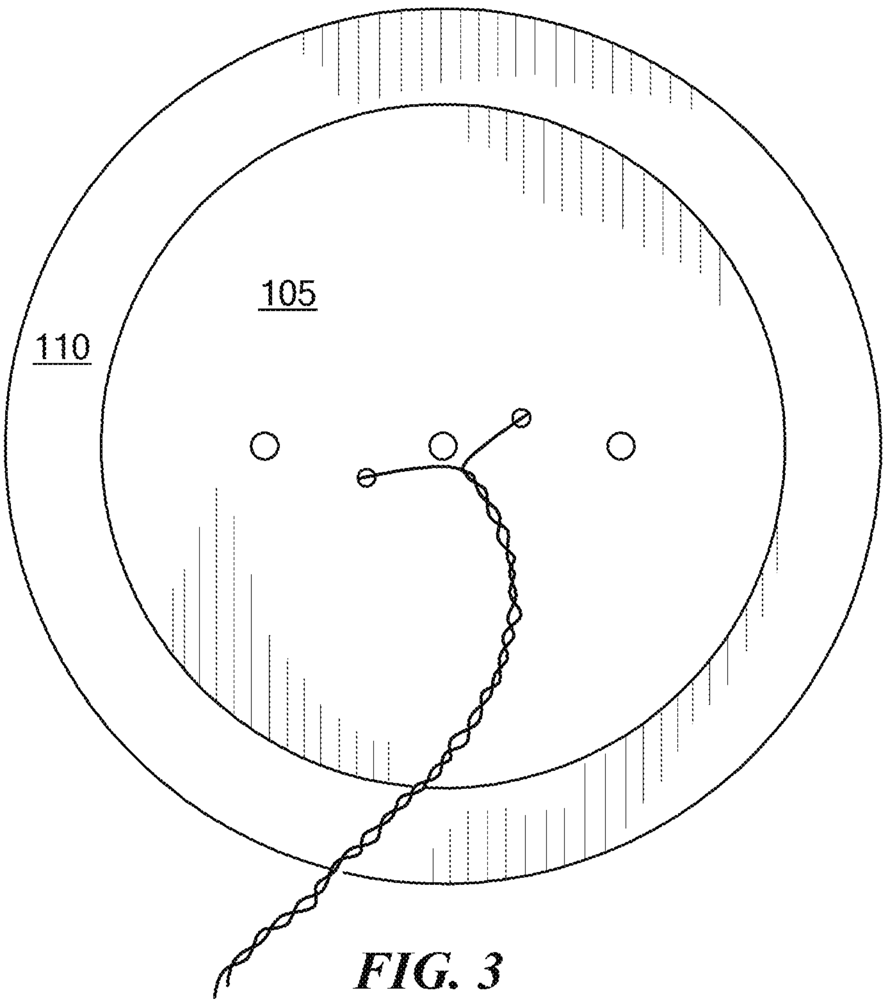
FIG. 3 depicts a bottom view of the luminaire of FIG. 1.
Figure 4:
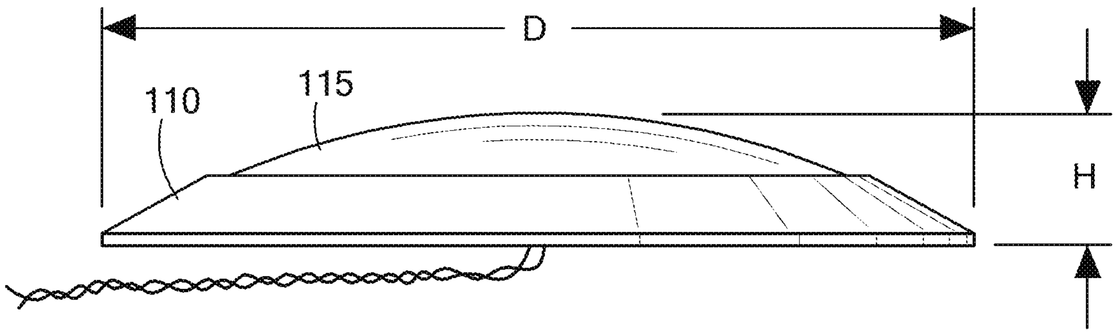
FIG. 4 depicts a side view of the luminaire of FIG. 1.
Figure 5:
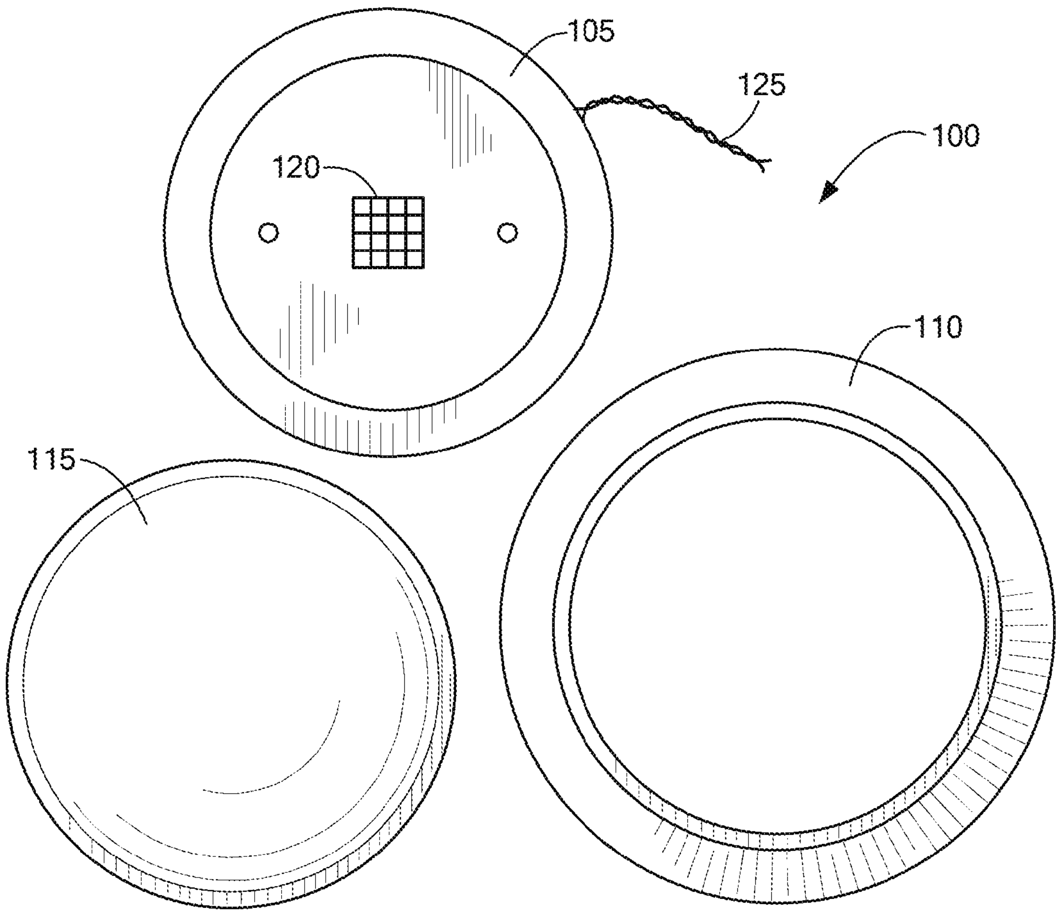
FIG. 5 depicts a top view of a heat spreader assembly, a heat sink, and an outer optic in accordance with an embodiment of the invention.
Figure 6:
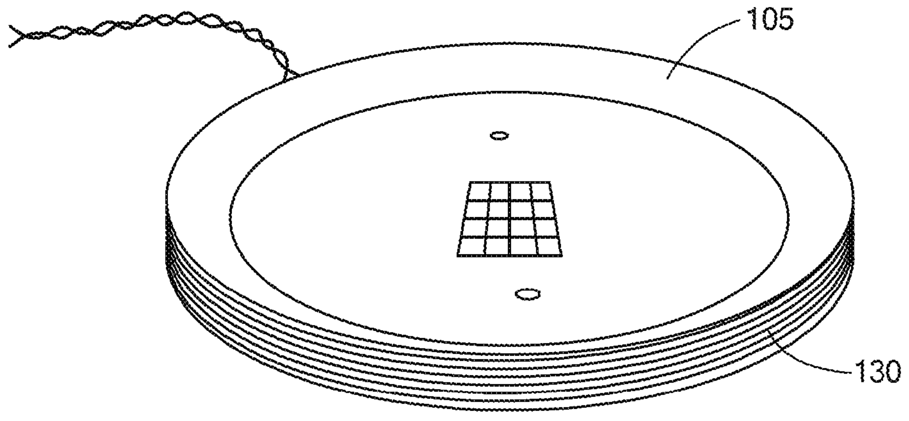
FIG. 6 depicts an isometric view of the heat spreader of FIG. 5.
Figure 7:
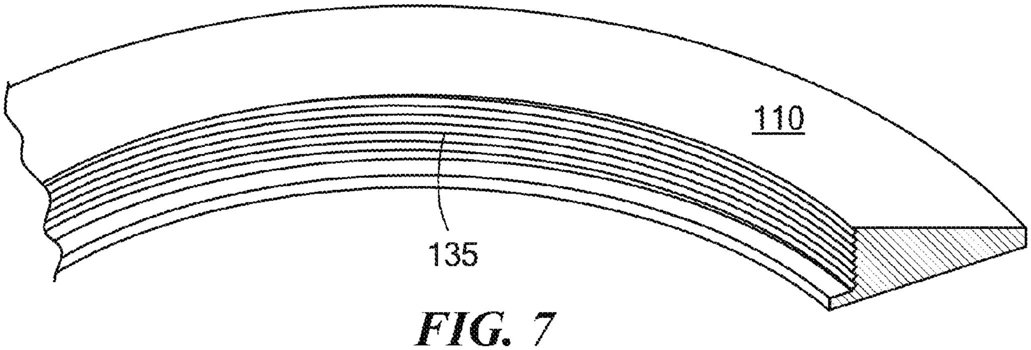
FIG. 7 depicts a partial isometric view of the heat sink of FIG. 5.
Figure 29:
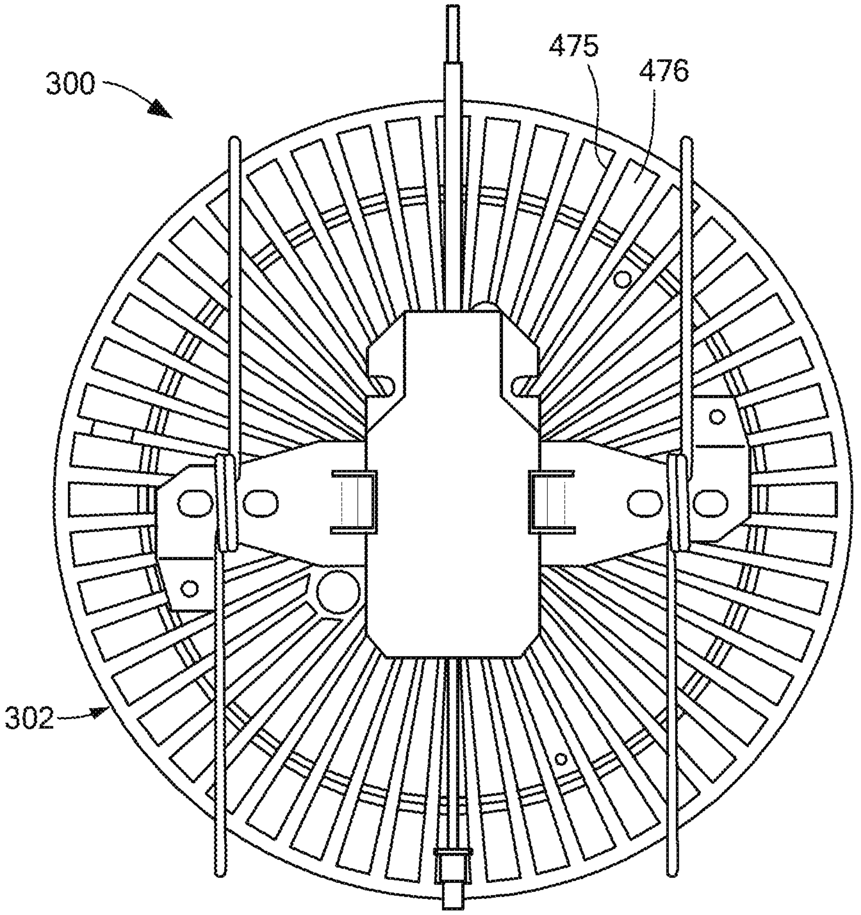
FIG. 29 depicts a back view of the luminaire of FIG. 27.

Reference is now made to FIGS. 28 and 29, which depict a side view and a back view, respectively, of the luminaire 300. As discussed above in reference to FIG. 28, an overall height H and an overall outside dimension D is such that the ratio of FWD is equal to or less than 0.25. The back view depicted in FIG. 29 is comparable with the back view depicted in FIGS. 3, 11 and 13, but with a primary difference that can be seen in the configuration of the heat sinking fins. In FIGS. 3, 11 and 13, the back surface 185 of the heat sink 110 includes a first plurality of recesses 190 oriented in a first direction, and a second plurality of recesses 195 oriented in a second opposing direction, with each recess of the first plurality and the second plurality having a shape that promotes localized air movement within the respective recess due at least in part to localized air temperature gradients and resulting localized air pressure gradients. Such recesses 190, 195 were employed at least in part due to the radial dimension of the heat sink 110, which is ring-like in shape. In FIG. 29, and as discussed above, the heat sink 310 is integrally formed with the heat spreader 305 to form the base 302. With such an integrally formed base arrangement, radially oriented heat sink fins 475 are integrally formed over a substantial portion of the back surface of the base 302, which provide for greater heat transfer than is available by the recesses 190, 195 having a more limited radial dimension that is limited by the configuration of the heat sink 110. Heat sink fins 475 alternate with adjacently disposed and radially oriented recesses 476 to form a star pattern about the center of the back side of luminaire 300. Such a star pattern provides a plurality of air flow channels on the back side of the base 302 for efficiently distributing and dissipating heat generated by the light source (LED) 120 disposed on the front side of the heat spreader 305 of the base 302.

Figure 30:
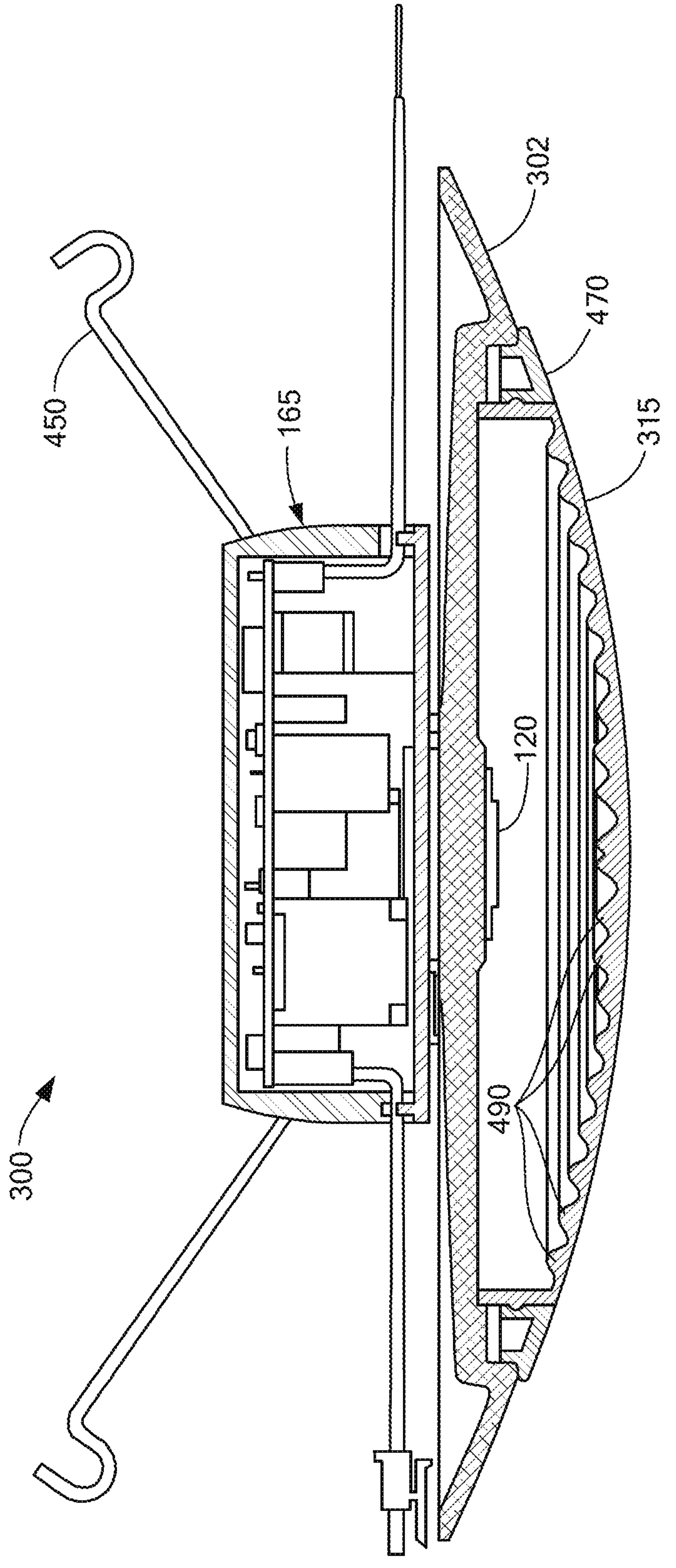
FIG. 30 depicts a cross section view of the luminaire of FIG. 27, and more particularly depicts a cross section view of the outer optic used in accordance with an embodiment of the invention.

In an embodiment, and with reference now to FIG. 30, the outer optic 315 forms a blondel-type lens having a plurality of concentric circular flutes/ridges 490 formed and disposed on the inside surface of the outer optic 315. With such a lens, the exact location of the light source 120 within the luminaire 300 is masked from the perspective of an observer standing a distance away from the luminaire 300, thereby providing for a more uniform distribution of light. Such a lens may also be suitable for outer optic 115. In an embodiment, the lens material used for outer optic 115, 315 may be frosted. Example materials considered suitable for use in outer optic 115, 315 include, but are not limited to, ACRYLITE® Acrylic Sheet Material available from CYRO Industries, and Acrylite Plus® also available from CYRO Industries.

Example materials considered suitable for use in reflector 145, 145' include, but are not limited to, MAKROLON® 2405, 2407 and 2456 available from Bayer Material Science, and MAKROLON® 6265 also available from Bayer Material Science.

While certain combinations of elements have been described herein, it will be appreciated that these certain combinations are for illustration purposes only and that any combination of any of the elements disclosed herein may be employed in accordance with an embodiment of the invention. Any and all such combinations are contemplated herein and are considered within the scope of the invention disclosed.

While embodiments of the invention have been described employing aluminum as a suitable heat transfer material for the heat spreader and heat sink, it will be appreciated that the scope of the invention is not so limited, and that the invention also applies to other suitable heat transfer materials, such as copper and copper alloys, or composites impregnated with heat transfer particulates, for example, such as plastic impregnated with carbon, copper, aluminum or other suitable heat transfer material, for example.

The particular and innovative arrangement of elements disclosed herein and all in accordance with an embodiment of the invention affords numerous not insignificant technical advantages in addition to providing an entirely novel and attractive visual appearance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A luminaire, comprising:

a heat spreader;

a heat sink thermally coupled to the heat spreader;

an outer optic securely retained relative to at least one of the heat spreader and the heat sink;

a light source disposed in thermal communication with the heat spreader, the light source comprising a plurality of light emitting diodes (LEDs) that are disposed on the heat spreader; and a power conditioner configured to receive AC voltage and to deliver DC voltage to the plurality of LEDs, the power conditioner being disposed on an opposite side of the heat spreader as the plurality of LEDs;

wherein a combination defined by the heat spreader, the heat sink and the outer optic is so dimensioned so as to:

cover an opening defined by a nominally sized can light fixture, and cover an opening defined by a nominally sized electrical junction box;

wherein the heat spreader and heat sink combine to form a base; and wherein the base is absent heat sink fins.

2. The luminaire of claim 1 wherein the heat spreader, the heat sink and the outer optic, in combination, have an overall height H and an overall outside dimension D such that a ratio of H/D is equal to or less than 0.25.

3. The luminaire of claim 1 wherein the heat sink is disposed diametrically outboard of the heat spreader.

4. The luminaire of claim 1 wherein the heat sink is substantially ring-shaped and disposed around and coupled to an outer periphery of the heat spreader.

5. The luminaire of claim 4 wherein the heat spreader and the heat sink are integrally formed.

* * * * *